United States Patent [19]
Singleton, Jr. et al.

[11] 3,881,879

[45] May 6, 1975

[54] AL-SI-MG ALLOY

[75] Inventors: Ogle R. Singleton, Jr.; Bennie R. Ward, Jr., both of Richmond, Va.

[73] Assignee: Reynolds Metals Company, Richmond, Va.

[22] Filed: Oct. 15, 1973

[21] Appl. No.: 406,351

Related U.S. Application Data

[60] Division of Ser. No. 186,632, Oct. 5, 1971, Pat. No. 3,788,824, which is a continuation-in-part of Ser. No. 18,255, March 10, 1970, abandoned.

[52] U.S. Cl. ............... 29/193; 29/183; 29/197.5; 75/147; 75/148
[51] Int. Cl. ................... C22c 21/02; C22c 23/00
[58] Field of Search ............ 75/147, 148; 29/197.5, 29/193, 183

[56] References Cited
UNITED STATES PATENTS

| | | | |
|---|---|---|---|
| 1,947,121 | 10/1932 | Bonsack | 75/148 |
| 2,075,090 | 3/1937 | Bonsack | 75/147 X |
| 2,525,130 | 10/1950 | Campbell | 75/148 X |
| 2,602,413 | 7/1952 | Miller | 75/147 X |
| 2,821,495 | 1/1958 | Dulin | 75/148 X |
| 2,823,995 | 2/1958 | Blackmun | 75/148 |
| 3,373,483 | 3/1968 | Miller | 75/147 X |
| 3,811,177 | 5/1974 | Schoer et al. | 75/147 X |

*Primary Examiner*—C. Lovell
*Assistant Examiner*—Arthur J. Steiner
*Attorney, Agent, or Firm*—Glenn, Palmer, Lyne & Gibbs

[57] ABSTRACT

An improved aluminum alloy, referred to as a core material, is provided which is particularly adapted for use in manufacturing articles by vacuum brazing techniques because such core material has optimum resistance to sag at brazing temperatures and because it has a solidus of about 1160 F to 1180 F, is heat treatable to a minimum yield strength of 12,000 psi, and is corrosion resistant. A heat treatable cladding alloy is also provided for use as a brazing component either alone or with such core material and other suitable core materials. The preferred cladding alloy has a liquidus of about 1,065 –1,085 F, has a narrow melting range of about 20 to about 40 F, is corrosion resistant, and provides joints of optimum strength and quality.

7 Claims, 4 Drawing Figures

PATENTED MAY 6 1975　3,881,879

AL-SI-MG ALLOY

This application is a division of Ser. No. 186,632 filed Oct. 5, 1971 (now U.S. Pat. No. 3,788,824) which is a continuation-in-part of Ser. No. 18,255 filed Mar. 10, 1970, now abandoned.

BACKGROUND OF THE INVENTION

It is well known in the art that products made from aluminum alloys which have been constructed by vacuum brazing are superior in many respects. In particular, vacuum brazed articles are superior because they do not Further, the utilization of a special brazing flux which may introduce corrosion problems and requires expensive cleaning operations after brazing. Further vacuum brazed articles have joint-defining surfaces which are kept relatively free of contamination by reducing the partial pressure of gaseous products and the vacuum environment eliminates contamination of surfaces to be joined by oxides, nitrides, or hydrates, which are usually found in varying amounts even in the best brazing furnaces which do not employ a vacuum environment. The net result is that aluminum joints brazed by vacuum brazing have improved strength and are of optimum quality.

Presently the only two commercially available aluminum alloys which are used extensively as core materials in vacuum brazing are 6951 and 3003 and it is well known that these core materials are not completely satisfactory for the volume production of articles such as heat exchangers, for example. In particular, 6951 alloy (having a solidus of about 1,140°F) sags excessively when brazed at temperatures greater than 1,100°F. On the other hand, 3003 alloy which has been used heretofore in vacuum brazing does not tend to sag as much as the 6951; however, 3003 alloy (having a solidus of about 1190°F) is generally unacceptable in many applications because it is not a heat-treatable alloy. Also, for practical design considerations, 3003 in the "0" temper ("as brazed") condition has a yield strength of 6000 psi, and accordingly is not considered an optimum alloy for use in manufacturing high performance heat exchangers of the type used in automobiles, for example.

The alloys which are presently used for cladding 6951 and 3003 core materials generally are completely melted only at temperatures which are too close to the temperature at which vacuum brazing is to be accomplished and usually these cladding alloys have a comparatively wide melting range which is very undesirable. It has also been found that present cladding alloys do not provide joints of optimum strength for numerous reasons including the great tendency for silicon present in the cladding material to migrate into the core material and the tendency for corrosion in the brazed joint due to the comparatively large dissimilarity between the constituents of commercially available materials and cladding alloys.

Heretofore commercially available aluminum alloys used in vacuum brazing have merely tolerated the presence of iron in the alloy as an impurity. However, it has been found in accordance with the present invention that iron may be deliberately added and controlled as an alloying element to improve the properties of either a core alloy or a cladding alloy.

SUMMARY

This invention provides improved aluminum alloys in the form of core alloys or materials and cladding alloys or materials for use in manufacturing articles by vacuum brazing techniques. The compositions of such core and cladding materials are metallurgically and chemically similar enabling these materials to be used in making improved composite constructions such as brazing sheets, for example, which produce high quality structures having optimum corrosion resistance. In addition, the improved core material of this invention has improved resistance to sag at vacuum brazing temperatures, is heat treatable to a minimum yield strength of 12,000 psi, and has a solidus of about 1,160°F to 1,180°F. This improved sag resistance at elevated temperatures renders the alloy suitable not only for brazing but also for such other processes as porcelain enameling in which, for example, the core may be clad with relatively pure aluminum.

The preferred cladding material of this invention is completely liquid at a temperature of about 1,065°–1,085°F. and has a narrow melting range of about 20° to about 40°F.

Other details, uses, and advantages of this invention will become apparent as the following description of the embodiments thereof taken in conjunction with the accompanying drawing proceeds.

BRIEF DESCRIPTION OF THE DRAWING

The accompanying drawing shows present exemplary embodiments of articles comprising the alloys of this invention and a presentation of sag profiles of such alloys compared with commercial alloys, in which.

DETAILED DESCRIPTION

Figure 1:
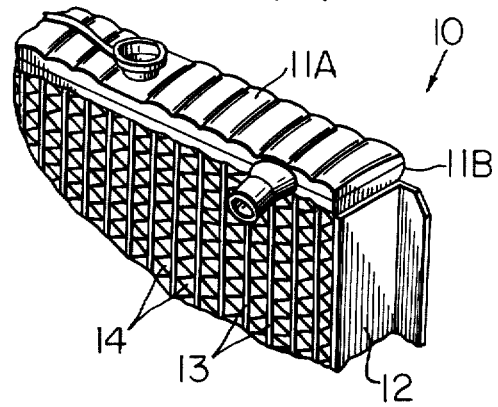
FIG. 1 is a fragmentary perspective view of an exemplary heat exchanger suitable for vacuum brazing using the improved alloys of this invention.

Articles such as heat exchangers, for example, which are made of aluminum alloys, have greater structural integrity when they are made using vacuum brazing techniques and this fact was mentioned earlier. A typical vacuum brazed heat exchanger in the form of an automobile radiator is illustrated in FIG. 1 of the drawing. The radiator 10 has component portions such as its tank 11A, for example, made of a core or composite material of this invention. The lower portion of the tank 11A, i.e., the header 11B, the inside surfaces of the oppositely arranged supporting plates 12, and a major portion of the exposed surfaces of the flattened tubular members 13 may be suitably clad with the improved cladding material of this invention to enable such radiator to be assembled and held together on an associated fixture with its fins 14 in position in any manner, as is well known in the art, and then vacuum brazed at a suitable brazing temperature, for example, at about 1,115°F (preferably controlled within tolerances of plus 25°F and minus 15°F.

CORE MATERIALS

Although any suitable core alloy or material may be used with the various cladding materials of this invention the preferred core material is an aluminum base alloy having a solidus temperature of about 1160°F to 1180°F, particularly when such core material is used with a cladding alloy or material of this invention which is completely liquid at about 1065°–1085°F (typically 1075°F) and has a narrow melting range of about 20° to 40°F (typically 30°F). Thus, upon holding the radiator 10 in assembled relation on its fixture and placing it in a commercial brazing oven of known construction which is heated to a suitable brazing temperature, preferably about 25°F above the liquidus of the cladding and at least 25°F below the solidus of the core, the component portions thereof are brazed together as one unit.

The following are examples of core alloys or materials of this invention having elements as set forth.

| Core Alloy Example 1 | |
|---|---|
| ELEMENT | AMOUNT (By Weight) |
| Magnesium | About 0.3 – 0.6% |
| Silicon | About 0.2 – 0.5% |
| Manganese | Up to about 0.7% |
| Iron | About 0.2 – 0.8% |
| Chromium | Up to about 0.6% |
| Others | Each less than .05% with total less than 0.15% |
| Aluminum | Balance |

| Core Alloy Example 2 | |
|---|---|
| ELEMENT | AMOUNT (By Weight) |
| Magnesium | About 0.3 – 0.6% |
| Silicon | About 0.2 – 0.5% |
| Manganese | About 0.3 – 0.7% |
| Iron | About 0.2 – 0.8% |
| Chromium | Up to about 0.6% |
| Others | Each less than .05% with total less than 0.15% |
| Aluminum | Balance |

| Core Alloy Example 3 | |
|---|---|
| ELEMENT | AMOUNT (By Weight) |
| Magnesium | About 0.3 – 0.6% |
| Silicon | About 0.2 – 0.5% |
| Manganese | Up to about 0.7% |
| Iron | About 0.2 – 0.8% |
| Titanium | About .01 – .10% |
| Chromium | Up to about 0.6% |
| Others | Each less than .05% with total less than 0.15% |
| Aluminum | Balance |

| Core Alloy Example 4 | |
|---|---|
| ELEMENT | AMOUNT (By Weight) |
| Magnesium | About 0.3 – 0.6% |
| Silicon | About 0.2 – 0.5% |
| Manganese | Up to about 0.3% |
| Iron | About 0.2 – 0.5% |
| Chromium | About 0.1 – 0.6% |
| Others | Each less than .05% with total less than 0.15% |
| Aluminum | Balance |

| Core Alloy Example 5 | |
|---|---|
| ELEMENT | AMOUNT (By Weight) |
| Magnesium | About 0.3 – 0.6% |
| Silicon | About 0.2 – 0.5% |
| Manganese | About 0.3 – 0.7% |
| Iron | About 0.2 – 0.5% |
| Chromium | About 0.1 – 0.6% |
| Others | Each less than .05% with total less than 0.15% |
| Aluminum | Balance |

As previously indicated, iron is often present in commercially available aluminum alloys and tolerated as an impurity. However, it has been found by extensive tests that iron is effective as an aid in reducing silicon penetration into the core from the molten cladding and thus may be used to provide a core material which has the desired physical qualities. As seen from the above examples of core alloys, iron is preferably controlled so that it constitutes about 0.2 – 0.8 percent by weight of the alloy. Where chromium is also present, the iron content may be reduced to about 0.2 – 0.5 percent.

Magnesium is provided in the core alloy to assure that desired mechanical property levels may be attained and manganese to assure that the core material has optimum sag resistance at brazing temperature.

Titanium may also be introduced in controlled amounts, especially 0.01 – 0.10 percent, as shown in Core Example No. 3, to help control the grain size of the alloy.

As previously indicated, commercially available core materials used in vacuum brazing are 6951 and 3003. 6951 alloy is generally unacceptable for brazing above 1,100°F because it sags excessively, but may be used with the cladding alloys of the present invention for brazing at lower temperatures or with adequate support.

Figure 2:
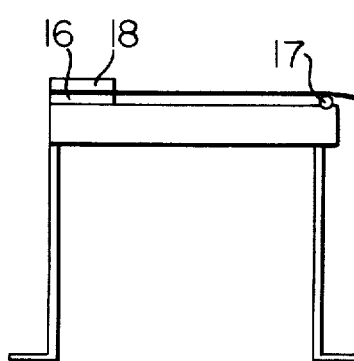
FIG. 2 schematically illustrates sag profiles of sample strips made using exemplary aluminum alloys of this invention compared with sag profiles of sample strips made of 6951 and 3003 alloys wherein such sagging is provided by heating the strips in a vacuum brazing oven.

FIG. 2 illustrates the sag profiles of five exemplary test strips or samples which will be designated strips A, B, C, D, and E and the constituent elements and their percentages by weight are shown on the chart which is presented below.

| Sample | Thickness (Inches) | % Si | % Fe | % Mn | % Mg | % Others | % Al |
|---|---|---|---|---|---|---|---|
| A | .0215 | .22 | .55 | .30 | .30 | Less than .15 | Balance |
| B | .022 | .37 | .75 | .01 | .58 | Less than .15 | Balance |
| C | .024 | .42 | .67 | .48 | .59 | Less than .15 | Balance |
| D | .022 | | | Commercial 3003 alloy | | | |
| E | .022 | | | Commercial 6951 alloy | | | |

Each test sample A-E was 7.865 inches long, 0.750 inch wide, and had a thickness as indicated on the above chart. The samples were supported on a support plate 16 and a horizontal support or pin 17 with approximately 1.865 inches at one end portion of each sample held firmly in a horizontal manner on supports 16 and 17 by a clamping plate 18 and the remaining 6 inches projecting beyond the horizontal pin 17 in a cantilevered manner. The samples A–D were then subjected to a vacuum environment and heated to a temperature of 1,125°F whereby each sample A through D sagged due to heating as shown in FIG. 2.

The sag profile for strip E represents sagging for this strip at 1,100°F when subjected to a similar vacuum environment as the strips A-D. The 1,100°F temperature was selected as the maximum for 6951 alloy because all heat exchanger assemblies made from brazing sheet using 6951 core alloy and brazed at 1,100°F had acceptable sag, but at only slightly higher temperatures of 1,105°F – 1,110°F such assemblies had borderline sag judged unacceptable commercially. Thus, the sag at 1,100°F for sample E using 6951 alloy is considered the base for comparing the exemplary core alloys of this invention and 3003 alloy with 6951 alloy.

It is apparent from FIG. 2 that the core alloys of this invention A, B, and C are superior in their resistance to sag compared to alloy E and at least as good as alloy D, wherein alloys D and E are commercially available 3003 and 6951 alloys respectively. Sag resistance is important in brazed articles because if there is excessive sag during brazing, it is extremely difficult to hold manufacturing tolerances and produce sound joints even by using complicated and expensive fixtures.

Although 3003 alloy provides good resistance to sag, it is not heat treatable and has a yield strength of only 6000 psi in the "0" temper condition. The core alloys of this invention, typified by samples A through C, are heat treatable, i.e., they may be precipitation hardened to achieve a yield strength of at least 12,000 psi.

Thus, it should be emphasized that the improved core alloys of this invention have superior sag resistance to the commercially available 6951 whereby such alloys are particularly adapted for use in vacuum brazing. Further, the core alloys of this invention may be heat treated so that they have a yield strength which is at least about twice the yield strength of 3003, which is the other commercially available aluminum alloy commonly used in vacuum brazing.

CLADDING MATERIALS

This invention also provides cladding materials or alloys which are particularly adapted for use with the core materials having compositions essentially as presented above and such cladding alloys provide superior performance when used with these and other core materials which are to be vacuum brazed. The cladding materials of this invention include those which melt within a narrow range (preferably not exceeding 30°F) and typically have a liquidus temperature of about 1075°F. Such cladding materials are capable of achieving optimum results with commercially acceptable tolerances at a brazing temperature of about 1115°F.

The following are examples of cladding alloys or materials of this invention having elements as set forth.

Cladding Alloy Example 1

| ELEMENT | AMOUNT (By Weight) |
|---|---|
| Silicon | About 11.0 – 14.5% |
| Iron | About 0.2 – 1.2% |
| Chromium | Up to about 0.25% |
| Magnesium | About 0.2 – 1.0% |
| Others | Each less than .05% with total less than 0.15% |
| Aluminum | Balance |

Cladding Alloy Example 2

| ELEMENT | AMOUNT (By Weight) |
|---|---|
| Silicon | About 11.0 – 14.5% |
| Iron | About 0.2 – 1.2% |
| Chromium | Up to about 0.25% |
| Magnesium | About 0.2 – 1.0% |
| Manganese | Up to about 0.3% |
| Others | Each less than .05% with total less than 0.15% |
| Aluminum | Balance |

Cladding Alloy Example 3

| ELEMENT | AMOUNT (By Weight) |
|---|---|
| Silicon | About 11.0 – 14.5% |
| Iron | About 0.2 – 1.2% |
| Chromium | About 0.10 – 0.20% |
| Magnesium | About 0.2 – 1.0% |
| Manganese | Up to about 0.3% |
| Others | Each less than .05% with total less than 0.15% |
| Aluminum | Balance |

Cladding Alloy Example 4

| ELEMENT | AMOUNT (By Weight) |
|---|---|
| Silicon | About 11.0 – 14.5% |
| Iron | About 0.2 – 1.2% |
| Chromium | Up to about 0.25% |
| Magnesium | About 0.2 – 1.0% |
| Copper | Up to about 0.3% |
| Others | Each less than .05% with total less than 0.15% |
| Aluminum | Balance |

Cladding Alloy Example 5

| ELEMENT | AMOUNT (By Weight) |
|---|---|
| Silicon | About 11.0 – 14.5% |
| Iron | About 0.2 – 1.2% |
| Chromium | Up to about 0.25% |
| Magnesium | About 0.2 – 1.0% |
| Zinc | Up to about – 0.5% |
| Others | Each less than .05% with total less than 0.15% |
| Aluminum | Balance |

In addition to the foregoing examples of presently preferred embodiments, other related compositions suitable for use as a brazing component, whether as cladding or in other forms, have been found to include aluminum base alloys consisting essentially of aluminum, about 9–14.5 percent silicon, about 0.2–0.8 percent iron and about 0.25–0.7 percent magnesium. Such alloys also may include one or more of the minor alloying elements chromium, manganese, copper and zinc, in amounts up to about 0.25 percent Cr, 0.5 percent Mn, 0.3 percent copper and 0.5 percent Zn. The silicon content is preferably about 10.5–14.5 percent when it is desired to achieve a liquidus temperature of about 1065°–1085°F. and a melting range of about 20° to about 40°F., but a lower silicon content may be used when the brazing conditions are less critical.

The following further examples are illustrative of these additional cladding alloys of the present invention:

Cladding Alloy Example 6

| ELEMENT | AMOUNT (By Weight) |
|---|---|
| Silicon | About 9 – 14.5% |
| Iron | About 0.2 – 0.8% |
| Chromium | Up to about 0.25% |
| Magnesium | About 0.25 – 0.7% |
| Manganese | Up to about 0.5% |
| Copper | Up to about 0.3% |

-Continued

| ELEMENT | Cladding Alloy Example 6<br>AMOUNT (By Weight) |
|---|---|
| Zinc | Up to about 0.5% |
| Others | Each less than .05% with<br>total less than 0.15% |
| Aluminum | Balance |

| ELEMENT | Cladding Alloy Example 7<br>AMOUNT (By Weight) |
|---|---|
| Silicon | 10.5 – 14.5 |
| Iron | About 0.2 – 0.8% |
| Magnesium | About 0.25 – 0.7% |
| Aluminum | Balance, exclusive of incidental<br>elements and minor impurities |

As in the case of the core alloys of this invention, iron, rather than being treated as an impurity in the cladding alloy (as has been done in previous brazing materials), is introduced as a controlled element. In quantities up to about 1.2 percent by weight iron has been found especially effective in controlling viscosity and hence flow of the cladding material consistently with maintaining a narrow melting range of the alloy.

It should also be noted that chromium may be a deliberate alloying element which contributes to brazability and corrosion resistance of the cladding when used in the range of up to about 0.25 percent of the composition. However, it has been found that chromium in the controlled range of 0.10 – 0.20 percent by weight provides the best results. For some uses, up to about 0.5 percent manganese may be added as a deliberate alloying element, with or without chromium, in others up to about 0.3 percent copper, and in still others, up to about 0.5 percent zinc. Magnesium has been added to control the mechanical properties of the cladding alloy, but the amount is limited to improve bondability. Copper and zinc in the amounts indicated are used respectively to control wettability and galvanic potential.

The amount of silicon in the cladding alloy may be in the range of about 9–14.5 percent of the total weight of the composition, but is preferably at least about 10.5 percent for reasons previously mentioned. The amount of silicon is important in that it is known that silicon diffusion or migration from the cladding material or alloy into the core material or alloy is harmful. The reduction of silicon in the cladding material has the effect, in hypoeutectic silicon alloys, of raising the liquidus temperature. The higher the liquidus temperature the less the flow at a given brazing temperature.

It has been found in accordance with the present invention that adding at least about 0.3 percent manganese by weight in the core tends to resist this silicon diffusion into the core material whereby a resulting article or structure formed utilizing both the core material and cladding of this invention exhibits optimum properties especially compatible with vacuum brazing. Thus, by precise control of the amount of silicon to achieve the desired melting range of the cladding alloy, and by use of manganese in the core to help control silicon diffusion, an improved brazing material has been provided by this invention.

The core and cladding alloys or materials of this invention may be made in any form and used in any manner, including those known in the art, and either with each other or with commercially available materials or alloys. For example, the core alloys may be produced in any suitable form, such as tube, rod, sheet, or other wrought articles; and the cladding alloys may be used for cladding such articles to provide a composite brazing component, or made into separate brazing components in such wrought forms as O-rings, strips, discs, wire and the like, for use as inserts which are mechanically held against or between the parts to be joined, thereby furnishing the necessary filler material for joining such parts by brazing.

Figure 3:
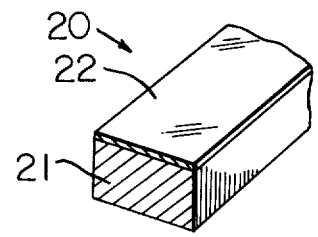
FIG. 3 is a perspective view with parts in cross section and parts broken away illustrating an exemplary sheet material having both its core and cladding on one surface of the core made of improved aluminum alloys defined in accordance with the teachings of this invention.

Preferably, the cladding materials or alloys are each provided in the form of cladding, in layer form, on an article such as a composite or brazing sheet 20 having a plurality of layers, as shown in FIG. 3. The exemplary sheet 20 is comprised of a core alloy 21 which may have constituent elements as presented in any of the above examples and such sheet has a cladding alloy 22 clad on one side thereof. The alloy 22 may have constituent elements essentially as presented above.

Figure 4:
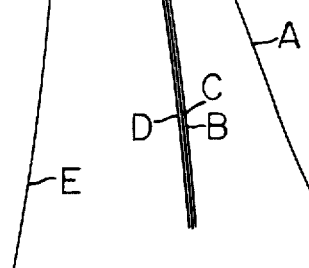
FIG. 4 is a view similar to FIG. 3 illustrating an improved core material provided with improved cladding on opposed surfaces thereof.
Figure 4:
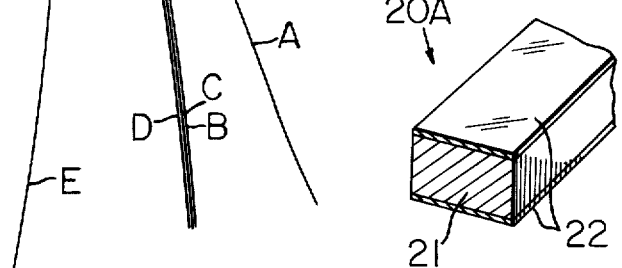

A brazing sheet may also be provided essentially as illustrated in FIG. 4 of the drawing and designated generally by the reference numeral 20A. The brazing sheet 20A may be comprised of a core material 21 made with constituent elements as outlined above and may be provided with cladding 22 on both sides thereof with the cladding alloy 22 also having constituent elements as outlined above.

The thickness of the cladding which is provided on a given sheet, such as the sheet 20 or 20A will vary, depending upon the overall thickness of the composite sheet. For production sheets particularly adapted for use in vacuum brazing having a composite or total thickness of 0.024 inch or less, the cladding thickness on a side may be about 10 percent of the overall thickness; for sheets 0.025 inch to 0.063 inch, the cladding thickness on a side may be about 8 percent of the composite thickness; and, for sheets having a composite thickness of 0.064 inch and above the cladding thickness on a side may be about 4 percent of the composite thickness. The above percentages of cladding thickness are typically applied regardless of whether one or both sides of the sheet are clad.

The ratio of the thickness of the cladding to the thickness of the core may be varied to suit the joining conditions without appreciably changing the strength of the resulting product. It will also be apparent from a detailed comparison of constituent elements of the core and cladding that the composition of the cladding and the core are metallurgically and chemically similar, thereby providing a system which has excellent corrosion resistance.

The composite construction, such as sheets 20 and 20A, defined by a core alloy of this invention clad with a cladding alloy as taught herein also resists silicon migration from the cladding into the core to a greater extent than any previously known heat treatable brazing sheet composite; further, the composite construction has unexpectedly high resistance to sag during preheating for vacuum brazing and may be heat treated to provide yield strengths of 12,000 psi.

The composite sheet construction of this invention also exhibits the greatest spread of temperature between cladding liquidus and core solidus of any heat treatable brazing composite known heretofore. In particular, and as has been pointed out earlier, the preferred cladding alloy is completely liquid at about 1,065°–1,085°F. while the solidus of the core material is about 1,160°F to 1,180°F, whereby a minimum temperature spread of approximately 75°F is provided. This large temperature spread between solidus of the core alloy and liquidus of the cladding alloy enables commercial vacuum brazing furnaces to be equipped with less sophisticated and hence comparatively inexpensive temperature controls.

In this example of the invention, an exemplary heat exchanger 10 has been shown as being made utilizing an improved core alloy and an improved cladding alloy as taught by this invention; however, it is to be understood that any suitable product may be made from the unique alloys as taught by this invention.

Articles in the form of sheets 20 and 20A have been illustrated in FIGS. 3 and 4 respectively merely as examples of composite constructions each using core and cladding alloys of this invention. However, it will be appreciated that composite constructions having any form, shape, etc., may be made using the alloys of this invention.

While present exemplary embodiments of this invention, and methods of practicing the same, have been illustrated and described, it will be recognized that this invention may be otherwise variously embodied and practiced within the scope of the following claims.

What is claimed is:

1. An article comprising a brazing component in wrought form, adapted to provide filler material for bonding parts to be joined by brazing, said component being composed of an aluminum base alloy consisting essentially of aluminum, about 11–14.5 percent Si, about 0.2–1.2 percent Fe, up to about 0.25 percent Cr, up to about 0.3 percent Mn, and about 0.2–1.0 percent Mg by weight, in amounts effective to achieve a narrow melting range not exceeding 30°F and a liquidus temperature of about 1075°F.

2. An article according to claim 1 in which the iron content of said alloy is at least 0.6 percent by weight.

3. An article according to claim 1 in which said alloy contains about 0.3 percent manganese by weight.

4. An article according to claim 1 in which the chromium content of said alloy is about 0.10–0.20 percent by weight.

5. An article according to claim 1 in which said alloy includes up to about 0.3 percent copper by weight.

6. An article according to claim 1 in which said alloy includes up to about 0.5 percent zinc by weight.

7. A brazing component in the form of an O-ring, strip, disc, wire or the like, adapted for use as an insert between parts to be joined by brazing, said component being composed of an aluminum base alloy consisting essentially of aluminum, about 9–14.5 percent Si, about 0.2–0.8 percent Fe, and about 0.25–0.7 percent Mg by weight in amounts effective to achieve a melting range of about 20° to about 40°F. and a liquidus temperature of about 1065–1085°F.

* * * * *